Nov. 20, 1934.  F. A. WEGENER  1,981,012
CONTROL DEVICE
Filed Dec. 30, 1930   3 Sheets-Sheet 1
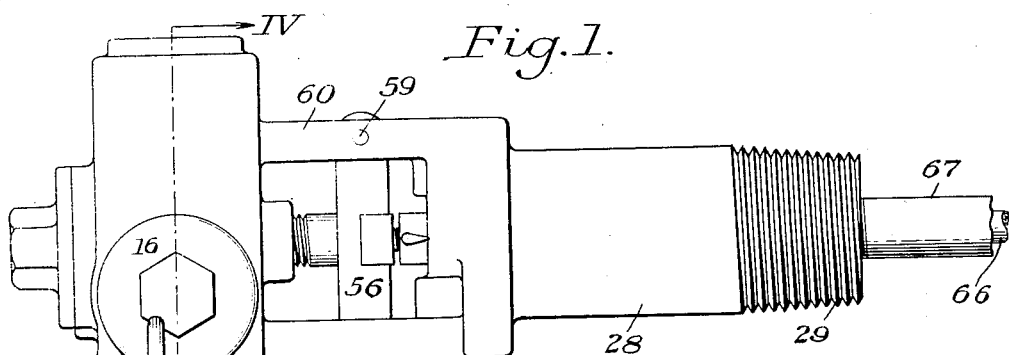
Fig.1.
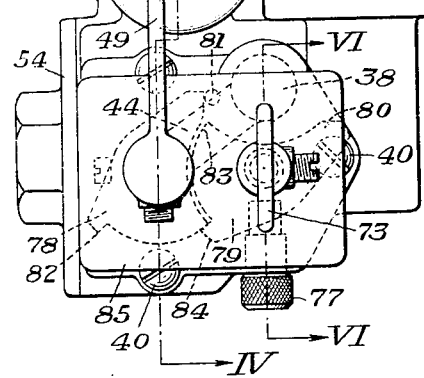
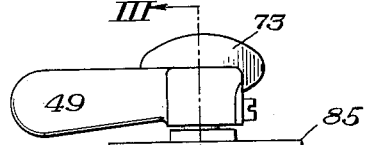
Fig.2.
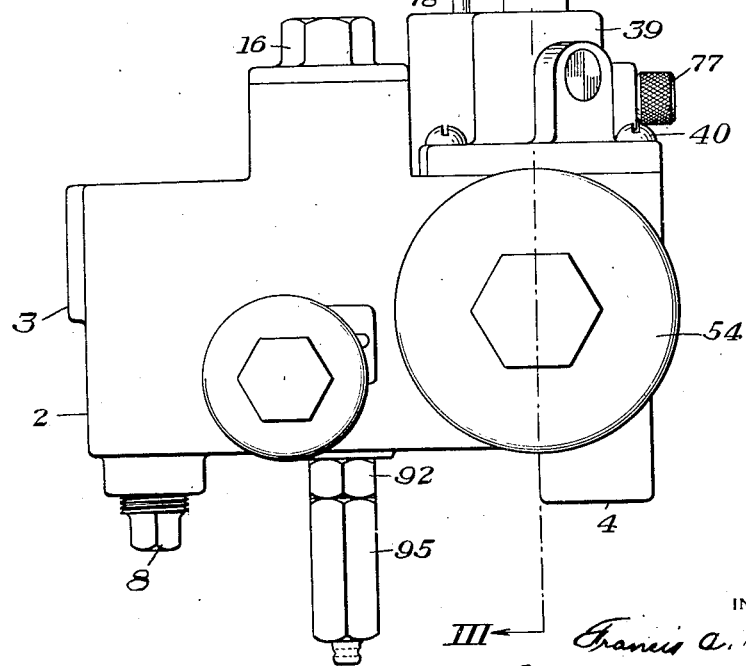
INVENTOR
Francis A. Wegener Nov. 20, 1934.  F. A. WEGENER  1,981,012
CONTROL DEVICE
Filed Dec. 30, 1930  3 Sheets-Sheet 2

INVENTOR
Francis A. Wegener

Nov. 20, 1934.   F. A. WEGENER   1,981,012
CONTROL DEVICE
Filed Dec. 30, 1930   3 Sheets-Sheet 3
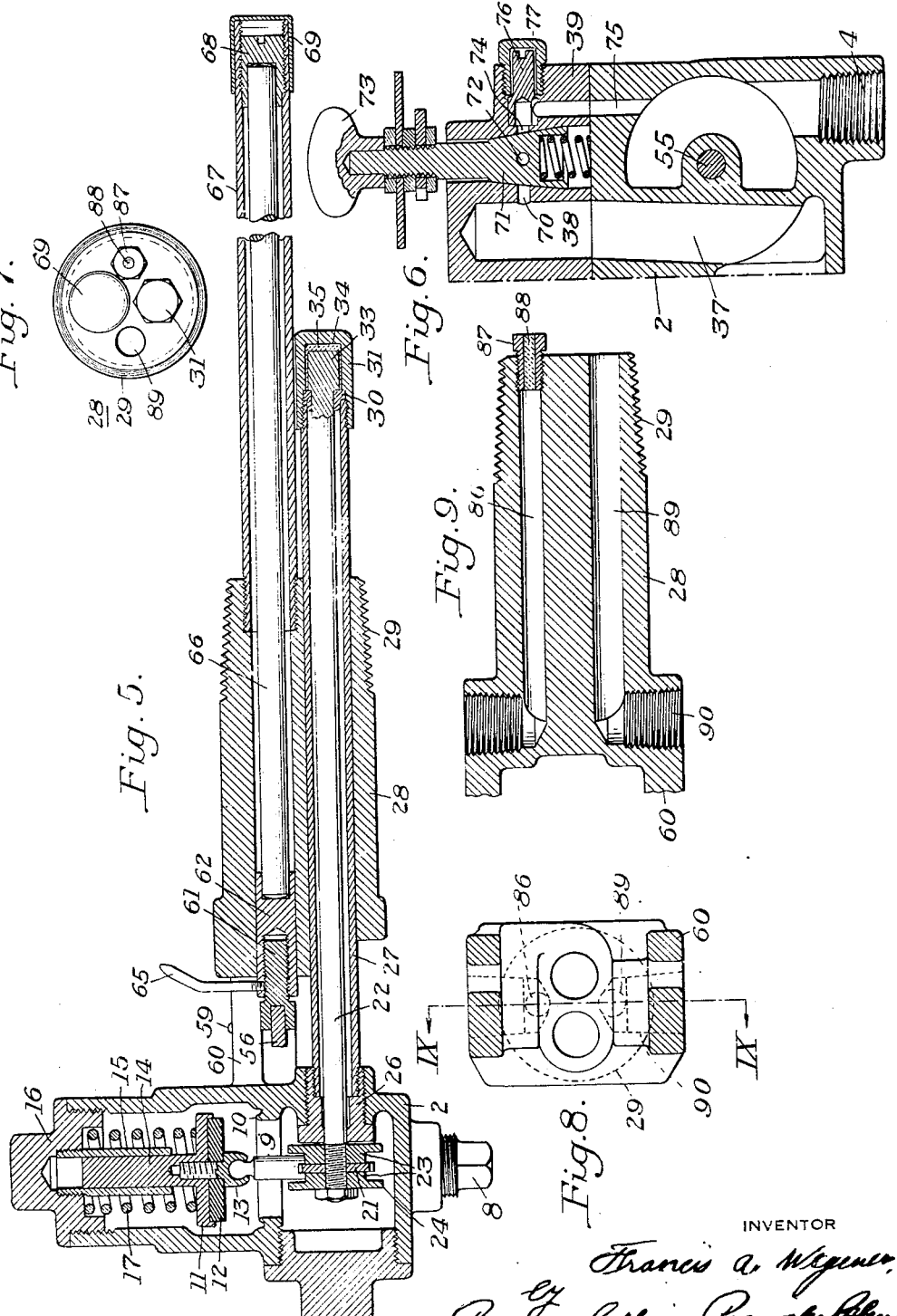
INVENTOR
Francis A. Wegener, Patented Nov. 20, 1934

1,981,012

UNITED STATES PATENT OFFICE 1,981,012

CONTROL DEVICE

Francis A. Wegener, Gloucester, N. J., assignor to Welsbach Company, Gloucester City, N. J., a corporation of New Jersey Application December 30, 1930, Serial No. 505,519

15 Claims. (Cl. 236—21)

The present invention relates broadly to the art of fluid distribution and temperature regulation, and more particularly to an improved control device adapted to incorporate heat responsive and safety features rendering it desirable as a regulating means for controlling burners utilized in the heating of different substances. For purposes of illustration it is hereinafter referred to as utilized for regulating the temperature of a storage heater for hot water, but it will be understood that the utility of the invention is not thus limited.

It is customary in the art to provide temperature responsive valves adapted to control the supply of a fluid, such as gas, to a burner. Under all normal conditions of operation, such regulating means operate effectively to control the maximum and minimum temperature conditions by effecting an opening and closing movement of the valve in accordance with temperature conditions. I have found, however, that it not infrequently happens that due to some defect in the valve structure, or the accumulation of foreign material between the valve and its seat, the valve is prevented from completely closing and cutting off the supply of fluid being controlled. Under such conditions, sufficient fuel may continuously pass the valve so as to operate the burner sufficiently to continue increasing the temperature of the medium being heated to such a point that an element of danger is involved.

The present invention has for one of its objects the combination with a valve of the general character referred to, of safety means cooperating therewith and effective in case of emergency, such as occasioned by extremely high temperatures, for insuring cessation of fluid flow to the burner.

As a further precautionary measure, the present invention also preferably contemplates the provision of a casing having incorporated therein means serving to effectively remove foreign material from the fluid being controlled. In this manner, possibility of the accumulation of foreign material under any of the parts of the structure is minimized.

The present invention also preferably contemplates the provision of manual shut-off means, the provision of by-pass controlling means, and a safety interlock between such means.

The invention also preferably has incorporated in the physical embodiment thereof additional safety means adapted to permit pressure release in case of abnormal pressure conditions.

It has heretofore been proposed in the general art to which the present invention relates, to provide more or less standardized temperature responsive valves together with supplemental safety features cooperating therewith and susceptible for individual or supplemental installation. The present invention is characterized by a single body carrying all of the features referred to whereby the installation of such single device is automatically effective for producing the results desired. Such a unitary body is further desirable for the reason that it minimizes the number of openings required in the container, tank or the like provided for the medium being heated, and thereby minimizes the possibility of leaky joints, improper installation, or weakening of such container.

Other advantages and objects of the invention will be apparent as the same becomes better understood by reference to the accompanying specification and drawings forming a part thereof. In the drawings:

Figure 1 is a top plan view of a device constructed in accordance with the present invention;

Figure 2 is an end elevational view of the device illustrated in Figure 1;

Figure 5 is a longitudinal sectional view, partly in elevation and partly broken away, along the line V—V of Figure 4, looking in the direction of the arrows;

Figure 6 is a detail section, partly in section and partly in elevation, along the line VI—VI of Figure 1, looking in the direction of the arrows;

Figure 7 is an end elevational view of the right hand end of the device as viewed in Figure 5;

Figure 8 is a transverse sectional view along the line VIII—VIII of Figure 3, looking in the direction of the arrows; and Figure 9 is a detail sectional view along the line IX—IX of Figure 8, in the direction illustrated by the arrows.

Figure 4:
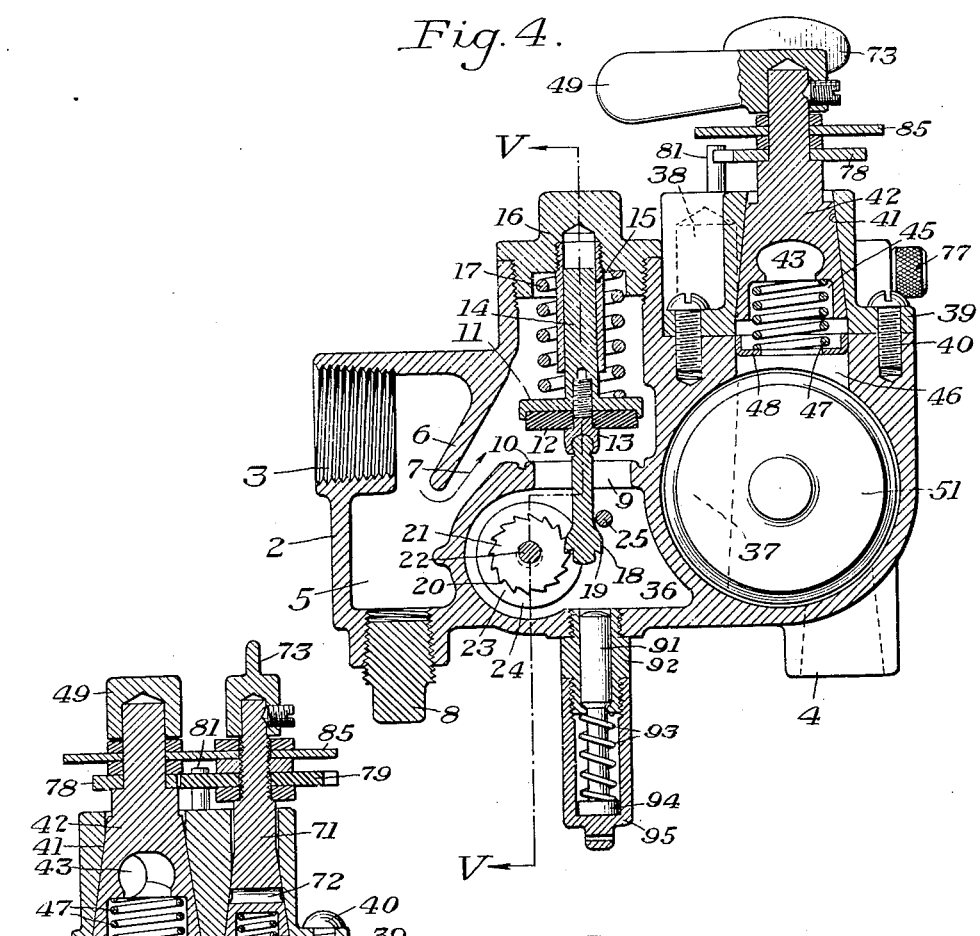
Figure 4 is a transverse sectional view along the line IV—IV of Figure 1, looking in the direction of the arrows.

In carrying out the present invention there may be provided a valve body or casing 2 preferably of cast construction and suitably cored to provide an inlet connection 3 for the fluid to be controlled, and an outlet connection 4 for such fluid.

Adjacent the inlet opening 3 there is formed a separating chamber or dirt trap 5 into which solid material carried by the admitted fluid is deflected downwardly by a baffle 6, the fluid continuing upwardly around the baffle in the direction indicated by the arrow 7. The bottom of the chamber 5 is preferably provided with a clean-out plug 8 permitting the same to be emptied periodically at the pleasure of the operator with the device completely installed.

The fluid having been cleaned of foreign material, is adapted to pass through an emergency port 9. Surrounding this port is a valve seat 10 with which, under emergency conditions as hereinafter referred to, is adapted to cooperate a valve 11 of suitable construction. This valve is herein illustrated as carrying a washer 12 held in position by a swivel nut 13, the swivel nut having a threaded stem passing upwardly through the washer and valve into a valve stem 14. This valve stem is illustrated as being held in position and guided by a guide sleeve 15 threaded into a removable cap 16 carried by the casing 2. Surrounding the guide sleeve 15 is a spring 17 bearing at one end against the cap 16 and at the opposite end against the valve 11 in such manner that the valve is normally urged toward its closed position.

For normally maintaining the emergency cut-off valve in open position to permit the continued passage of fluid through the emergency port 9, the swivel nut 13 carries a depending pawl 18 adapted, insofar as its mounting on the swivel nut is concerned, to swing substantially universally. At its lower end the pawl 18 is shaped to provide an annular tooth engaging projection 19 in such position as to cooperate with any one of the ratchet teeth 20 on a ratchet wheel 21. This ratchet wheel, as will be apparent more particularly from Figure 5 of the drawings, is mounted on a shaft 22 intermediate nuts 23 threaded onto the shaft and provided with peripheral flanges 24 adapted to project outwardly beyond the periphery of the wheel 21 and thus partially shroud the same and thereby limit lateral swinging movement of the pawl 18 in a direction transversely of the face of the ratchet wheel. Movement in a direction toward and from the face of the ratchet wheel is in turn limited by a pin 25 suitably secured in the casing 2 in such manner as to permit slight inward and outward movement of the lower end of the pawl while preventing complete disengagement between the pawl and the ratchet wheel.

From the foregoing description it will be apparent that so long as the shaft 22 is prevented from rotating, the emergency cut-off valve 11 will be maintained in its elevated position out of contact with the seat 10. This shaft is illustrated as journaled adjacent one end in a bearing 26 carried by the casing 2. This bearing is in turn internally threaded to receive one end of a tubular casing 27, which casing is adapted to project outwardly from the casing 2 in concentric relationship to the shaft 22, through a connecting extension 28 secured to the casing. This connecting extension is provided at its outer end with an external thread 29 adapted to be threaded into a container, reservoir, tank or the like such as a water heater of the storage type before referred to. Surrounding the shaft 22 adjacent the end remote from the casing 2 is a ferrule 30 constituting a second bearing for the shaft and in turn mounted within a removable cap 31. Adjacent the ferrule 30 and within the cap 31 the shaft 22 is provided with an enlarged head 33, this head being of such over-all dimensions as to be spaced from the interior walls of the cap 31. Preferably the extreme end of the head 33 and the bottom wall 34 of the cap 31 are accurately machined in such manner as to provide an appreciable space therebetween and preclude the possibility of any binding action. Into this space 35 thus provided is poured or placed a suitable quantity of a material fusible at some predetermined temperature. Thus if the maximum temperature which it is desired to permit is in the neighborhood of 206 to 212° F. there will be selected a fusible alloy fusing within this temperature range. At normal temperatures, or at temperatures below 206° the fusible alloy will set, thus locking the head 33 to the cap 31 and precluding rotation of the shaft 32 and thereby holding the emergency cut-off valve in open position.

The fluid having passed through the emergency port 9 into the space 36, travels upwardly therefrom through a substantially vertically extending passageway 37 formed in the valve casing. This passageway at its upper end communicates with a similar passageway 38 in a cored closure 39 secured to the main valve casing through the medium of machine screws 40.

Formed also in the closure 39 is a tapered seat 41 adapted to receive and seat a plug cock 42 of similarly tapered contour. The plug cock is provided with a transversely extending port 43 adapted to register with a laterally extending port 44 communicating at one end with the passage 38 and projecting through the cock seat at its opposite end. Communicating with the transverse port 43 in the plug cock is an axial port 45 communicating at its lower end with a passage 46 in the valve casing 2. For normally holding the valve 42 against its seat, the axial passage 45 may be shaped to receive a spring 47 bearing at its upper end against the valve and at its lower end resting on a seat 48 in the passage 46, the seat being perforated to permit the flow of fluid therethrough.

For operating the valve 42, which constitutes a manually controlled cut-off for the main fluid supply, it may be extended upwardly as clearly illustrated in Figure 4 of the drawings and provided with an operating handle 49. By means of this handle the valve may be turned to bring the port 43 therein into registration with the port 44 to permit the flow of fluid therethrough, or to destroy such communication.

Figure 3:
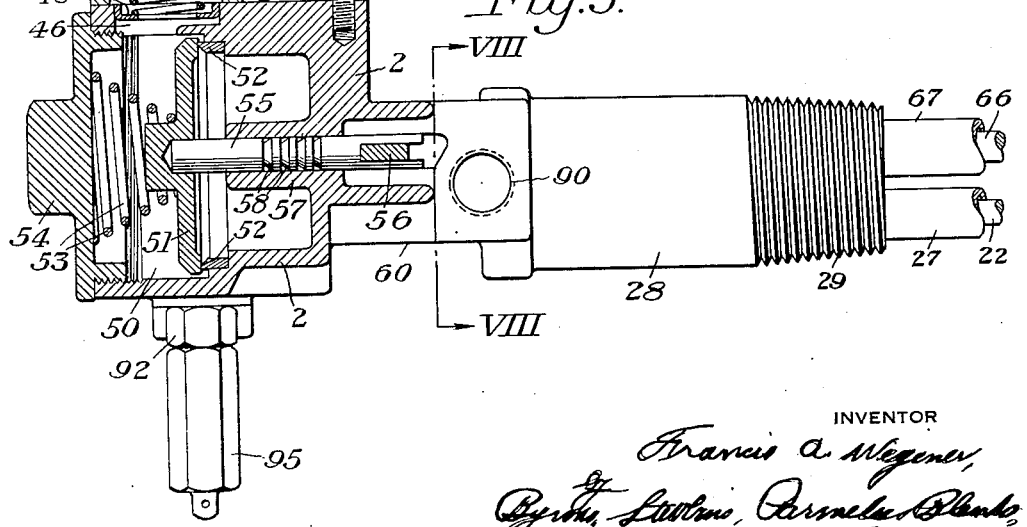
Figure 3 is a view partly in section along the line III—III of Figure 2, looking in the direction of the arrows.

With the valve turned in such position that fluid is permitted to pass therethrough into the passage 46, it flows into a main valve chamber 50. Within this chamber there is provided a valve 51 normally urged toward its seat 52 by means of a spring 53 bearing at one end against the valve and at the opposite end against a removable cap 54 in the casing 2. With the valve 51 in the position illustrated in Figure 3, the further passage of the main body of fluid is prevented. For opening this valve, however, to permit the fluid to pass to the connection 4, there is provided a combined actuating and packing pin 55 bearing at one end against the valve 51, and at the opposite end bifurcated to straddle an operating lever 56. The intermediate portion of the pin is guided in a bearing 57 in the valve casing and is preferably formed with sealing grooves 58 adapted to receive heavy grease or oil so as not only to facilitate movement thereof, but to provide a gas-tight joint.

The actuating lever 56 has its free end in engagement with the pin 55, its opposite end having a pivotal mounting 59 in a yoke 60 which connects the valve casing to the connecting extension 28. Bearing against the side of the lever 56 opposite to that engaged by the pin 55 is an adjusting screw 61 bifurcated to straddle the lever, as clearly illustrated in Figure 5, and having a reduced portion externally threaded to extend into a pressure plug 62. The pressure plug is guided within the extension 28 for sliding engagement, such as required to permit adjustment and operation of the parts. Carried by the pressure plug 62 is an operating finger 65 by means of which relative rotation between the screw and plug may be obtained.

It will be apparent that rotation in one direction will be effective for increasing the over-all length of the screw and plug, whereas rotation in the opposite direction will decrease the effective over-all length of these parts. In this manner there is afforded adjustment such as to insure operation of the valve 51 at different temperatures. The temperature responsive mechanism for operating the valve comprises a rod 66 having a relatively low co-efficient of expansion. This rod at one end is engaged in a recess in the plug 62, while at its opposite end it projects into a tube 67 of such material as to have a relatively high co-efficient of expansion as compared to that of the rod 66. The tube 67 is provided at its free end with a plug 68 threaded into position therein and providing a seat for the rod 66. In initially assembling the parts, the plug 68 is so adjusted as to insure operation within the desired temperature range. Thereafter the end of the tube is closed by a cap 69.

With the parts assembled, and the extension connection 28 in position within the container, it will be apparent that both the tube 67 and the tube 27 project into the interior of the container so as to be subject to the conditions therein. Under normal conditions of operation, as the temperature of the medium being controlled increases, the tube 67 will expand and thereby relieve pressure from the lever 56, permitting the valve 51 to close under the influence of the spring 53 to cut off the main supply of fluid to the connection 4 leading to the burner. On the other hand, as the temperature of such medium drops, the tube 67 will contract, thereby causing the rod 66 to open the valve 51. Thus under all normal conditions of operation, the temperature responsive valve 51 will constitute the sole control for the main body of fluid.

Should it happen, however, that the temperature responsive mechanism fails to work, or that the valve 51 is held away from its seat for any reason, the fluid being controlled will continue to pass to the burner and the temperature of the medium within the tank will continue to increase. Should this happen, the fusible connection 55 will reach a temperature such that it will fuse and release the shaft 22, thereby permitting the emergency shut-off valve 11 to close under the influence of its spring 17. From what has already been said, it will be apparent that the emergency shut-off valve 11 and the valve 51 are in series and effective on the same fluid. Either of these valves is therefore effective for cutting off the supply of fluid to the burner.

The manual shut-off valve 42 is likewise in series with the valves 11 and 51, and upon operation is similarly effective for cutting off the main supply of fluid to the burner. The valve 42, however, being manually operated does not provide any safety features, such features being afforded by the emergency cut-off valve and the temperature responsive valve, both of which are controlled by temperature conditions through different operative connections, all of which connections, however, project through the connection extension 28 so as to lie in closely adjacent relationship, which relationship is determined by the installation of the single connection 28.

In devices of this character it is desirable to provide for a continuous minimum supply of fluid to the burner to serve in the nature of a pilot supply. In the illustrated embodiment this is accomplished by providing a port 70 communicating with the passage 38 (Figure 6) and leading through the seat of a by-pass or pilot cut-off plug cock 71. This valve has a transverse port 72 extending therethrough adapted, when the valve is turned through the medium of handle 73, to connect the port 70 to a discharge port 74. This port is in registration with a by-pass port 75 discharging into the casing 2 on the discharge side of the valve 51 and thus leading directly to the outlet connection 4. While the valve 71 provides the maximum capacity for pilot conditions, this capacity is regulable at will by a controlling valve 76 accessible for adjustment upon removal of an enclosing cap 77. In Figure 6 the parts are illustrated in such position that the pilot supply is cut off.

For obvious reasons of safety, it is desirable to provide such an interconnection between the valves 42 and 71 as to preclude such an operation thereof as to permit turning on of the valve 42 without having previously opened the valve 71. This is accomplished in the illustrated embodiment of the present invention by providing the valve 42 with a cam 78 and providing the valve 71 with a second cam 79, the two cams being so located as to lie in the same plane. In Figure 1 of the drawings the valves are illustrated in their cut-off position. In this position the cam 79 interfits with the cam 78 so as to prevent rotation of the valve 42.

With the parts in this position, however, the valve 71 may be turned in a counter-clockwise direction as viewed in Figure 1 to such an extent as to bring a projection 80 thereon into engagement with a stop pin 81. With these parts in engagement, the passage 72 will be in communication with the ports 70 and 74. Thereafter, the valve 42 may be rotated in a counter-clockwise direction until such time as a projection 82 on the cam 78 comes into engagement with the side 83 of the cam 79. At this time the port 43 in the valve 42 will be in such position as to permit the flow of fluid to the temperature responsive valve 51. When it is desired to cut off the flow of fluid to the burner, the valve 42 is turned in a clockwise direction, or into the position illustrated in Figure 1, and the valve 71 is thereupon rotated in clockwise direction as viewed in this figure, to the extent permitted by engagement of a projection 84 on the cam 79 with the periphery of the cam 78.

The two cams in question are protected by the provision of a cover plate 85 adapted to embrace the stems of the valves 42 and 71 and provide a partially enclosed space within which the cams may operate. The present structure also embodies further safety features. As will be apparent more particularly from Figure 9 of the drawings, the extension connection 28 is provided with a passageway 86 extending completely therethrough and closed at one end by a plug 87 having a fusible material 88 therein. So long as this fusible material is intact, the passage of the contents of the tank or container through the passageway 86 is prevented. Should, however, the temperature of the medium therein rise to such a point as to fuse the material 88, the escape of such medium and consequent pressure reduction within the container will be permitted. The passageway 86 may obviously be closed through suitable connections to a drain or the like. Such an arrangement is particularly desirable in case of a source of heat for the container which is supplemental to the burner. Such a source may comprise a furnace coil or the like.

Also extending through the extension 28 is a passageway 89 communicating at one end directly with the interior of the tank or container, and at its opposite end with a threaded connection 90 adapted to lead to a pressure relief valve (not shown) or its equivalent. This may be useful in case of closed systems in which it is desired to make provision for automatic pressure release.

The structure described will illustrate a distinct advance of fusible means 35 over a fusible means such as illustrated at 88. With the fusible means 88, it is impossible to make a test to determine whether the metal will fuse at the desired temperature. If the test is made, and the metal fuses, it is thereafter necessary to insert a new supply of metal which may have a different fusing point. Thus any test made can only be determinative as to the metal which is in position. With the fusible material 33, however, this is not true. The parts may all be assembled, and the metal 35 subjected repeatedly to temperature high enough to cause fusing. The metal being completely confined, it will reset upon cooling and be ready for a succeeding fusing operation. It is thus possible with the structure completely assembled to readily determine the effectiveness of the material 35.

In actual use, should the temperatures be such as to cause fusing of the metal 35 and closing of the emergency cut-off valve, this valve may be opened as soon as the metal 35 again solidifies, through the medium of a re-setting device illustrated more particularly in Figure 4. This device comprises a plunger 91 within a bearing 92 in the valve casing and normally held in the position illustrated in this figure by a spring 93. The head 94 of the re-setting device is enclosed within a removable cap 95. Upon removal of this cap, it is possible to press the re-setting device upwardly against the action of the spring 93 to the extent required for bringing it into engagement with the pawl 18. It will be noted that the axis of the re-setting device is slightly offset with respect to the axis of the pawl, whereby pressure exerted against the pawl through the medium of the re-setting device will, by reason of the curved surfaces on both the re-setting device and pawl, tend to swing the pawl to the left as viewed in Figure 4 to insure continued engagement between the same and the ratchet wheel 20 so that when pressure is released on the re-setting device the pawl will be in engagement with one of the ratchet teeth.

Thereupon the cap 95 may be again applied and the parts will be ready for a succeeding operation.

From the foregoing description it will be apparent that I have provided a unitary structure including a casing having a single extension thereon adapted to extend into a container, the casing carrying a plurality of valves adapted to control a fluid with individual temperature responsive means carried by said extension and effective on the respective valves for controlling their operation. The advantages of this construction from the description already given will be apparent. In addition to these advantages, the structure also possesses the advantages of being capable of a pre-test, and installation as a unit with the consequent desirable results incident thereto. It likewise incorporates additional safety features and manual controlling means the utility of which have been set forth.

While I have herein illustrated and described a preferred embodiment of the present invention, it will be understood that changes in the construction and operation of the parts may be made without departing either from the spirit of the invention or the scope of my broader claims.

I claim:

1. As an article of manufacture, a casing having a single extension thereon adapted to extend into a container, a temperature responsive valve in said casing, temperature responsive means carried by said extension for operating said valve, an emergency cut-off valve within said casing in series with said first mentioned valve as to fluid flow, and other temperature responsive means carried by said extension embodying mechanism for operating said emergency cut-off valve, said operating mechanism including relatively movable parts and fusible material confined between said parts in all operating positions thereof and whether the said material is in the solid or the fused state.

2. As an article of manufacture, a casing having a single extension thereon adapted to extend into a container, a temperature responsive valve in said casing, temperature responsive means carried by said extension for operating said valve, an emergency cut-off valve within said casing in series with said first mentioned valve as to fluid flow, and other temperature responsive means carried by said extension for operating said emergency cut-off valve, said operating mechanism including relatively rotatable parts, and fusible material confined between said relatively rotatable parts.

3. A fluid control, comprising a casing having inlet and outlet connections for the fluid, a plurality of valves in said casing effective in series on fluid passing from said inlet to said outlet, a single extension carried by said casing for extending into and attaching the same in operative relation to a container, and a plurality of temperature responsive means carried by said extension and controlling the operation of said valves, said extension having a fusible fluid release automatically resetting connection therein.

4. In a fluid control device, a casing, a plurality of valves in said casing effective in series on fluid flowing therethrough, temperature responsive means for controlling the actuation of said valves, a manually operable cut-off valve in series therewith and carried by said casing, and a by-pass valve carried by said casing and interlocked with said first mentioned manual valve.

5. As an article of manufacture, a valve casing having a connecting extension projecting therefrom, a temperature responsive means carried by said extension and passing entirely therethrough, a second temperature responsive means carried by said extension and passing entirely therethrough, and a plurality of valves in series in said casing controlled by said temperature responsive means, one of said temperature responsive means including a rotatable shaft and fusible means in confined relation thereto effective for preventing rotation of said shaft upon solidification thereof.

6. As an article of manufacture, a casing having a temperature responsive valve therein, temperature responsive means for actuating said valve, an emergency cut-off valve in series with said first mentioned valve, temperature responsive means for actuating said emergency cut-off valve, said second mentioned temperature responsive means including fusible means automatically re-effective upon solidification thereof, and resetting means for said emergency cut-off valve.

7. As an article of manufacture, a casing having a temperature responsive valve therein, temperature responsive means for actuating said valve, an emergency cut-off valve in series with said first mentioned valve, temperature responsive means for actuating said emergency cut-off valve, said second mentioned temperature responsive means including fusible means automatically re-effective upon solidification thereof, and resetting means for said emergency cut-off valve, there being a single extension carried by said casing for securing all of said parts in cooperative relation to the medium being controlled.

8. As an article of manufacture, a casing having an extension thereon, a plurality of valves within said casing adapted to control a common fluid, and a plurality of temperature responsive means for controlling the operation of said valves, one of said temperature responsive means including a detent for one of said valves and a fusible metal effective when melted for releasing said detent, and when cooled for automatically re-engaging said detent.

9. As an article of manufacture, a casing having an inlet connection for all of the fluid to be controlled, an outlet connection for all of the fluid supplied to said inlet connection, a main supply passage for conducting the main supply of fluid from the inlet to the outlet, a by-pass passage for ensuring a minimum flow of fluid between the inlet and the outlet, a normally inoperative valve between said inlet and outlet and effective when operated for cutting off the entire flow between the inlet and outlet, a second normally operative valve in series with said first mentioned valve for controlling fluid flow through said main supply passage, and temperature responsive means operative at different temperatures for controlling the position of said valves.

10. As an article of manufacture, a casing having an inlet connection, an outlet connection for all of the fluid supplied to said inlet connection, a normally inoperative valve between said inlet and outlet and effective when operated for cutting off the entire flow therebetween, a second normally operative valve in series with said first mentioned fuel valve for controlling a part only of the fluid flow between said inlet and outlet connections, and temperature responsive means operative at different temperatures for controlling the position of said valves.

11. As an article of manufacture, a casing having a valve therein normally urged toward closing position, a ratchet wheel within said casing, a pawl engaging said ratchet wheel and normally holding the valve in open position, a shaft carrying said ratchet wheel, a confined body of fusible material exteriorly of said casing and into which a portion of said shaft projects for preventing rotation of said shaft at any temperature below the fusing point of said material, and means exteriorly of said casing for resetting the valve to open position after fusing of said material.

12. As an article of manufacture, a casing having an extension thereon, a valve within the casing, means for normally holding the valve open including a shaft extending through the extension, said valve being held open as long as rotation of the shaft is prevented and released when rotation of the shaft is permitted, and fusible material engaging said shaft for preventing rotation thereof while in the solid state.

13. As an article of manufacture, a casing having an extension thereon, a valve within the casing, and means for normally holding the valve open including a shaft extending through the extension and fusible material carried by said extension and normally freezing the shaft to the extension to prevent rotation of the shaft.

14. As an article of manufacture, a casing having an extension thereon, a valve within the casing, and means for normally holding the valve open including a shaft extending through the extension and fusible material confined between the shaft and the extension and normally freezing the shaft to said extension to prevent rotation thereof.

15. As an article of manufacture, a casing containing a valve, an extension on said casing, and temperature responsive means for operating said valve under predetermined temperature conditions, said temperature responsive means including a shaft rotatable within said extension and fusible material normally freezing said shaft to said extension to prevent rotation of the shaft, said fusible material being fusible under said predetermined temperature conditions.

FRANCIS A. WEGENER.